UNITED STATES PATENT OFFICE.

GEORGE W. KENDALL AND ROBERT R. ROBERTS, OF NEW ORLEANS, LA., ASSIGNORS TO THE GOLDEN BUTTER COMPANY, OF SAME PLACE.

PROCESS OF TREATING BUTTER.

SPECIFICATION forming part of Letters Patent No. 253,820, dated February 14, 1882.

Application filed November 17, 1881. (No specimens.)

*To all whom it may concern:*

Be it known that we, GEO. W. KENDALL and ROBERT R. ROBERTS, of New Orleans, and State of Louisiana, have invented a new and useful Process for the Treatment of Butter, of which the following is a clear, full, and exact description.

Our invention relates to a process for purifying and sweetening rancid butter, and rendering it better able to stand warm climates without injury to its taste or quality.

To enable others skilled in the art to make and use our invention, we will proceed to describe the exact manner in which we have carried it out.

We take, say, about one hundred pounds of rancid butter and melt it in a suitable vessel. To this we add about thirty pounds of vegetable oil, preferably the crude or the refined cotton-seed oil, for "cutting" the butter and to facilitate filtration, and after being thoroughly stirred the mixture is filtered through bone-black or animal-charcoal. After filtration the mixture is run off into a settling-tank and allowed to cool, but still in a liquid state, when the coloring-matter is added, and about twenty pounds of fresh, sweet, and finely-flavored dairy-butter added to the mixture for the purpose of flavoring the same. After the mixture has been colored and flavored as described, broken ice is put into the tank with the mixture and all stirred together, and when partly congealed, salt is added to suit the taste. When in a proper condition for packing and storing, the butter is transferred to suitable vessels of the desired sizes, and is then ready for sale, transportation, and use, and will stand any and all changes of climate without deterioration in quality.

We do not confine ourselves to the proportions named, as these may be greatly varied and yet produce good results.

Having thus described our invention, what we claim as new, and desire to secure by Letters Patent, is—

The process herein described for the treatment of butter, which consists in first melting the butter and mixing therewith a vegetable oil, then filtering the mixture through bone-black, next adding the coloring-matter and a quantity of fresh sweet butter for the purpose of flavoring the mass, which is finally congealed by being brought in contact with ice, and is then ready for use, substantially as herein described.

GEO. W. KENDALL.
ROBERT R. ROBERTS.

Witnesses:
R. K. EVANS,
H. B. APPLEWHAITE.